(12) United States Patent
Schlüter et al.

(10) Patent No.: US 11,499,531 B2
(45) Date of Patent: Nov. 15, 2022

(54) CHECKING LIGHTNING CONDUCTORS FOR WIND TURBINES

(71) Applicants: Thorsten Schlüter, Barmstedt (DE); Heiner Strauß, Berlin (DE); Kim Weyrich, Traben-Trarbach (DE)

(72) Inventors: Thorsten Schlüter, Barmstedt (DE); Heiner Strauß, Berlin (DE); Kim Weyrich, Traben-Trarbach (DE)

(73) Assignee: RWE Renewables GmbH, Essen (DE)

( * ) Notice: Subject to any disclaimer, the term of this patent is extended or adjusted under 35 U.S.C. 154(b) by 84 days.

(21) Appl. No.: 17/072,550

(22) Filed: Oct. 16, 2020

(65) Prior Publication Data

US 2021/0140409 A1 May 13, 2021

Related U.S. Application Data

(63) Continuation of application No. PCT/EP2019/054020, filed on Feb. 19, 2019.

(30) Foreign Application Priority Data

Apr. 17, 2018 (DE) .................... 10 2018 109 049.8

(51) Int. Cl.
*F03D 17/00* (2016.01)
*F03D 80/30* (2016.01)

(52) U.S. Cl.
CPC ............. *F03D 17/00* (2016.05); *F03D 80/30* (2016.05); *F05B 2260/80* (2013.01)

(58) Field of Classification Search
CPC ......... F03D 17/00; F03D 80/30; G01R 27/16; G01R 31/58; F05B 2260/80
See application file for complete search history.

(56) References Cited

U.S. PATENT DOCUMENTS

| 2006/0133933 | A1* | 6/2006 | Wobben ................. F03D 17/00 416/61 |
| 2018/0048136 | A1 | 2/2018 | Aspas Puertolas et al. |
| 2022/0065228 | A1* | 3/2022 | Ponnada ................ F03D 17/00 |

FOREIGN PATENT DOCUMENTS

| DE | 31 14 247 C2 | 1/1984 |
| DE | 29 44 820 C2 | 6/1991 |

(Continued)

OTHER PUBLICATIONS

Gutierrez, A. et al. Condition Monitoring System for Wind Turbine Lightning Protection System, University of Colorado, 2021, sponsored by Siemens Gamesa. accessed on Feb. 21, 2022 from https://www.colorado.edu/mechanical/team-27-condition-monitoring-system-wind-turbine-lightning-protection (Year: 2021).*

(Continued)

*Primary Examiner* — Topaz L. Elliott
(74) *Attorney, Agent, or Firm* — Reinhart Boerner Van Deuren P.C.

(57) ABSTRACT

In a method, impulse response information indicative of an impulse response is determined based on an impulse introduced into a lightning conductor and characterized by an electromagnetic wave. The impulse response information representing at least a waveform and a travel time determined after the introduction of the impulse based on reflection thereof. Evaluation information is specified based on the determined impulse response information. The impulse response information is analyzed at least with respect to the represented waveform and travel time of the introduced and reflected electromagnetic wave. The evaluation information is indicative of whether or not the lightning conductor is functional. The determined evaluation information is output. Also disclosed are a device for practicing this method, a rotor blade for a wind turbine that includes at least one (Continued)

lightning conductor and a device for practicing the method, and a system with one or more devices for practicing the method.

12 Claims, 3 Drawing Sheets

(56) References Cited

FOREIGN PATENT DOCUMENTS

| DE | 10 2012 214 981 A1 | | 2/2014 |
|----|----|----|----|
| DE | 10 2013 217 129 A1 | | 3/2015 |
| JP | 2013-029351 A | | 2/2013 |
| JP | 2013029351 A | * | 2/2013 |
| JP | 2017-142071 A | | 8/2017 |
| JP | 2017-150324 A | | 8/2017 |

OTHER PUBLICATIONS

Hernandez-Mejia, J. Chapter 5: Time Domain Reflectometry, Georgia Tech NEETRAC, 2016. Accessed from http://www.neetrac.gatech.edu/cdfi-publications.html (Year: 2016).*

NFPA 780. Standard for the Installation of Lightning Protection Systems. 2004. Accessed from http://www.w1npp.org/events/2011/2011-F-1/SAFETY/LIGHTN-1.COM/NFPA_7-1.PDF (Year: 2004).*

Holt, M. The Path of Least Resistance. EC&M. 2001. Accessed from https://www.ecmweb.com/content/article/20886840/the-path-of-least-resistance (Year: 2001).*

Keysight Technologies. Time Domain Reflectometry Theory: For Use with Keysight 86100 Infiniium DCA. 2015. Accessed from http://emlab.uiuc.edu/ece451/appnotes/TDR_Keysight_Appnote_5966-4855E.pdf (Year: 2015).*

AEMC Instruments. What is a TDR? Retrieved from https://www.aemc.com/userfiles/files/resources/applications/cable/APP-CableTesters-WhatIsATDR.pdf (Year: 2004).*

* cited by examiner

CHECKING LIGHTNING CONDUCTORS FOR WIND TURBINES

CROSS-REFERENCE TO RELATED APPLICATIONS

This patent application is a continuation of PCT/US2019/054020, filed Feb. 19, 2019, which claims the benefit of German Patent Application No. 10 2018 109 049.8, filed Apr. 17, 2018, the entire teachings and disclosure of which are incorporated herein by reference thereto.

FIELD OF THE INVENTION

Exemplary embodiments of the invention concern the inspection of lightning conductors comprised by wind turbines, for example whether they are damaged or not.

BACKGROUND OF THE INVENTION

Wind turbines are equipped with a lightning protection system in the rotor blades. This system has to be inspected in regular intervals due to legal requirements. In accordance with the state of the art, this inspection consists of measuring the resistance of the lightning conductor comprised by a lightning protection system with a measuring device for whose application the measuring device measures between the beginning and the end of the lightning conductor.

The measurement has also to be carried out between different coupling points and the beginning, to the access of which personnel must rope down the respective rotor blade comprising the lightning conductor. This is complex, dangerous and also associated with high costs.

The disadvantage of this method is that it requires a lot of time and personnel, as the measuring device has to be attached to each blade with a rope shaft. The rotor of the wind turbine has to be re-turned for each measurement. In addition, the current measuring method is associated with a considerable risk of falling.

In addition, such resistance measurements have to be carried out every two years.

If a lightning conductor is damaged or defect, this may lead to the energy introduced by a lightning cannot be dissipated via the lightning conductor. Instead, the energy is conducted to nearby components, which can be severely damaged or even completely destroyed.

SUMMARY OF SOME EXEMPLARY EMBODIMENTS OF THE INVENTION

Based on this state of the art, it is the task of the present object to provide a solution for the inspection of lightning conductors comprised by wind turbines, which allows to carry out the corresponding inspection with low expenditure of time on the one hand and to minimize the risks, especially for the personnel performing an inspection of the lightning conductor, on the other hand.

This task is solved by a method according to the features of the independent claims.

According to a first aspect of the invention, a method is described, e.g. carried out by one or more devices, the method comprising:

determining impulse response information indicative of an impulse response, wherein the impulse response information is determined based on an impulse introduced into the lightning conductor which is characterized by an electromagnetic wave, wherein the impulse response information represents at least a waveform and a travel time determined after the introduction of the impulse based on its reflection;

specifying an evaluation information based on the determined impulse response information, wherein the impulse response information is analyzed at least with respect to the represented waveform and the travel time of the introduced and reflected electromagnetic wave, the evaluation information being indicative of whether or not the lightning conductor is functional; and outputting or causing the output of the specific evaluation information.

According to a second aspect of the invention, a device is described which is adapted or comprises corresponding means to perform and/or control a method according to the first aspect. Devices of the method according to the first aspect are or comprise in particular one or more devices according to the second aspect.

According to the second aspect of the invention, an alternative device is also described, comprising at least one processor and at least one memory containing computer program code, wherein the at least one memory and the computer program code are adapted to perform and/or control with the at least one processor at least one method according to the first aspect. A processor is to be understood, for example, as a control unit, a microprocessor, a micro control unit such as a microcontroller, a digital signal processor (DSP), an application-specific integrated circuit (ASIC) or a field programmable gate array (FPGA).

For example, an exemplary device further includes means for storing information such as a program memory and/or a main memory. For example, an exemplary device according to the invention further comprises means for receiving and/or transmitting information via a network such as a network interface. For example, exemplary inventive devices are interconnected and/or connectable via one or more networks.

An exemplary device according to the second aspect is or comprises, for example, a data processing system which is set up in terms of software and/or hardware to be able to perform the respective steps of an exemplary method according to the second aspect. Examples of a data processing equipment are a computer, a desktop computer, a server, a thin client and/or a portable computer (mobile device), such as a laptop computer, a tablet computer, a wearable, a personal digital assistant or a smartphone.

Individual method steps of the method according to the first aspect (e.g. the determining of the impulse response information) can be performed here with a sensor device (e.g. measuring device), which also has at least one sensor element. Likewise, individual method steps (for example specifying the evaluation information), which, for example, do not necessarily have to be performed with the sensor device, can be carried out by a further device which is connected, in particular via a communication system, to the device which has at least one sensor element.

Further devices may be provided, for example a server and/or for example a part or component of a so-called computer cloud, which dynamically provides data processing resources for different users in a communication system. In particular, a computer cloud is understood to be a data processing infrastructure according to the definition of the "National Institute for Standards and Technology" (NIST) for the English term "Cloud Computing". An example of a computer cloud is a Microsoft Windows Azure® Platform.

According to the second aspect of the invention, a computer program is also described which comprises program instructions which cause a processor to perform and/or control a method according to the first aspect when the computer program runs on the processor. An exemplary program according to the invention may be stored in or on a computer-readable storage medium containing one or more programs.

According to the second aspect of the invention, a computer-readable storage medium is also described which contains a computer program according to the second aspect. A computer-readable storage medium may be, for example, a magnetic, electrical, electro-magnetic, optical and/or other type of storage medium. Such a computer-readable storage medium is preferably physical (i.e. "touchable"), for example it is designed as a data carrier device. Such a data carrier device is for example portable or permanently installed in a device. Examples of such a data carrier device are volatile or non-volatile random access memories (RAM) such as NOR flash memories or sequential access memories such as NAND flash memories and/or read-only memories (ROM) or read-write memories. Computer-readable shall be understood to mean, for example, that the storage medium can be read and/or written by a computer or data processing equipment, for example a processor.

According to a third aspect of the invention, a system is also described comprising several devices, in particular a server and a device for inspecting a lightning conductor, which together perform a method according to the first aspect.

An exemplary system according to the third aspect comprises an exemplary device, for example a mobile device or a server for performing an exemplary method according to the first aspect. Furthermore, the system may for example comprise a device for inspecting a lightning conductor, the device comprising for example an impulse generator and a measuring device.

For example, a rotor blade for a wind turbine or comprised by a wind turbine may comprise at least one lightning conductor (which is arranged, for example, internally or externally of the rotor blade) and means for inspecting the at least one lightning conductor, wherein the means for carrying out and/or implementing a method according to the first aspect of the present invention are formed and/or arranged.

Further details and details of the present object will be shown in the following on the basis of the described exemplary embodiments:

A lightning conductor in the sense of the invention is a device which has the task of preventing damage in the event of a lightning strike, e.g. to a device comprised by the lightning conductor, and also of diverting the current introduced by the lightning via a defined current path. Lightning conductors in wind turbines are in particular comprised by at least one rotor blade of the wind turbine. Examples of such lightning conductors are metal profiles, metal ropes and/or metal lines which are arranged inside the at least one rotor blade (also referred to as internal lightning conductors).

Furthermore, such lightning conductors can also be at least one mesh of copper wires (so-called meshes), which are arranged in or comprised by the blade surfaces and/or the blade edges of the rotor blade, for example. Metal profiles in the blade edges of the rotor blade may also represent such a lightning conductor. If the lightning conductor is not arranged inside the blade and/or the blade edge, such lightning conductors are also called external lightning conductors of a rotor blade. In order to define an impact point, such lightning conductors regularly comprise a receptor, e.g. a metal receptor, which is usually located at the outer blade tip of the rotor blade, since the blade tip (depending on the position of the at least one rotor blade of the wind turbine) represents the highest point of the wind turbine. The lightning conductor may, for example, be designed as a single conductor. Furthermore, the lightning conductor may be designed with or without a return conductor.

The impulse introduced into the lightning conductor is characterized or represented by an electromagnetic wave.

The impulse response information is determined, for example, by determining (e.g. measuring) a response signal that can be detected (e.g. measured) in response to the impulse introduced into the lightning conductor. The impulse response information then represents this measured signal (response signal), for example. The response signal is recorded, for example, after the impulse has been introduced into the lightning conductor, e.g. for the duration of a predefined time period, and/or by detecting (e.g. measuring) an amplitude of the measured response signal. The identification of the impulse response information may be done, for example, by means of a measuring device.

The response signal is determined, for example, by detecting (e.g. measuring) a reflected electromagnetic wave or several reflected electromagnetic waves, which are the result of the introduced impulse or impulses in the case of several impulses introduced into the lightning conductor. The response signal corresponds, for example, to an output signal of a system comprising the lightning conductor, in which the impulse, for example a Dirac impulse or an impulse approximating the Dirac impulse, with the highest possible amplitude is supplied to this system in the shortest possible time, is applied as the input. The introduced impulse is therefore, for example, a signal (e.g. electromagnetic wave) with an as high as possible amplitude over an as short as possible, i.e. limited, period of time.

The evaluation information is specified based on the determined impulse response information, whereby the impulse response information is analyzed at least with regard to the represented waveform and the travel time (e.g. signal travel time of the response signal) of the electromagnetic wave (impulse) introduced and then reflected. After the analysis has been performed, the evaluation information represents whether the lightning conductor is functional or not. The reflected response signal based on the introduced impulse is modified, for example, especially by disturbances, e.g. its travel time is changed (e.g. extended). This may be caused, for example, in particular by external disturbances to which the introduced impulse may be subject to during reflection until the response signal is detected. These may be, for example, disturbance variables such as open and/or (un-)shielded conductors, atmospheric coupling, or the like, to name a few non-limiting examples.

Subsequently, the specific evaluation information is output or its output is caused or a corresponding output may be triggered. A user may then carry out an action based on the specific evaluation information, e.g. if the evaluation information represents a non-functional lightning conductor, the output may be used to inform the user and subsequently carry out a repair, for example. Alternatively or in addition to this, the evaluation information may be output to another entity, e.g. a server, in a design of the method. For example, the evaluation information can represent whether the lightning conductor is functional or not. The server can store this evaluation information, for example. If the server stores a large amount of such evaluation information, a user or the user can, for example, obtain an overview of which lightning conductors, which are comprised in wind turbines, are functional or not. It is also conceivable that an action is automatically triggered with the output of the evaluation information, for example, a repair is initiated.

For example, the method according to the invention may be performed regularly, e.g. at predefined intervals. Alternatively or additionally, the method according to the invention may be carried out after an event has occurred, e.g. a lightning strike into the wind turbine. As a result, it can be determined in a timely manner whether a lightning conductor is functional or not. If, for example, a large number of such lightning conductors are tested by means of the method according to the invention, it becomes apparent immediately after the method has been carried out whether the lightning conductor is functional or not. Depending on the frequency with which the method according to the invention is carried out, it can thus be determined very quickly whether one or more lightning conductors, which are, for example, comprised by one or more wind turbines, are functional or not.

In this way, it is now possible to perform the inspection of the lightning conductor, which is, for example, comprised by a wind turbine, at least partially automatically. The device according to the second aspect of the present invention can, for this purpose, be comprised by the wind turbine, for example. In particular, such a device has an operative connection, e.g. via a hub on which rotor blades of the wind turbine are connected to a generator of the wind turbine, to the respective lightning conductors enclosed by the rotor blades. The device can now introduce an impulse into one of the lightning conductors via this connection and determine the impulse response information according to the method according to the first aspect of the present invention. A costly on-site personnel deployment for inspecting the lightning conductors comprised by the rotor blades of the wind turbine can be omitted.

On the one hand, this leads to an advantage on the cost side of the measurement, since the personnel and time required is greatly reduced. On the other hand, the danger of falling or injury to the personnel or the rope team is also prevented, which is a great advantage from a health and safety point of view.

According to an exemplary embodiment of all aspects of the invention, the specification of the evaluation information comprises a comparison of the waveform and/or travel time represented by the impulse response information with at least one reference information.

The at least one reference information is for example indicative of impulse response information of an undamaged lightning conductor. Accordingly, the at least one reference information can, for example, be defined or determined prior to the method according to the first aspect of the invention. To determine the at least one reference information, for example, an impulse is introduced into the undamaged lightning conductor and then the response signal is determined (e.g. measured). In order to ensure that the lightning conductor is undamaged, a further measurement of the lightning conductor may be performed, for example, in particular in the manner of an alternative measuring method, so that it can be ensured that the lightning conductor is undamaged. Alternatively or additionally, the lightning conductor can, for example, be used immediately after its manufacture to determine the at least one reference information, so that it can be ensured that an undamaged lightning conductor is used to determine the at least one reference information. Alternatively or additionally it can be ensured, e.g. by a manual check, that the lightning conductor is undamaged or that the at least one reference information is defined or determined.

The at least one reference information may, for example, represent or comprise identification information indicative of a kind, type and/or at least one property uniquely characterizing the lightning conductor (e.g. length, number of coupling points or the like, to only name a few non-limiting examples) or a corresponding identification information. The at least one reference information may, for example, optionally be defined or determined depending on the introduced impulse. For example, the at least one reference information associated with the undamaged lightning conductor may be a signal response to an introduced impulse, such as a Dirac impulse, a predefined amplitude and/or falling edge of an introduced impulse, to only name a few non-limiting examples. It goes without saying that for comparability the lightning conductor should then be checked with an identical impulse.

The impulse introduced may be a square impulse, for example. In addition, instead of one impulse, a sequence of impulses comprising at least two impulses can be introduced into the lightning conductor.

If the (cable) parameters of the lightning conductor are known, at least one reference information can also be entered directly, for example. This is especially recommended in case it is not possible to determine the at least one reference information otherwise.

If the lightning conductor is defective, i.e. the conductor is damaged in any way or even completely broken, the form of the reflected electromagnetic wave represented by the impulse response information changes.

According to an exemplary embodiment of all aspects of the invention, the specification of the evaluation information is based on one or more of the following parameters i) to ii):

(i) travel times of the introduced impulse; and
(ii) character of the reflected electromagnetic wave.

The travel time of the introduced impulse (signal) represented by the impulse response information is, for example, the time difference between the entry of a signal (in this case the impulse introduced into the lightning conductor) into the lightning conductor and the exit (reflection and/or fading away of the introduced impulse) after its reflection and/or (complete) fading away.

For example, the lightning conductor has an open cable end. An impulse introduced into the lightning conductor with the open cable end oscillates back and forth between the ends of the lightning conductor, whereby the intensity (i.e. amplitude) of the introduced impulse successively decreases. This is also called fading away of the impulse in the sense of the present object.

The character of the reflected electromagnetic wave (also called signal character) represented by the impulse response information is, for example, indicative of one or more reflection characteristics. For example, the signal character can form a voltage wave with exponentially descending characteristics in lightning conductors where parallel losses predominate. For example, the signal character can form a voltage wave with exponentially increasing characteristics for lightning conductors in which serial losses predominate. Accordingly, it can be determined, for example, whether the lightning conductor is correct or functional on the basis of the losses that occur. For example, in lightning conductors with an open end, only pulses and their reflections of the same polarity occur, wherein the amplitude of the reflections also decreases continuously. This can be represented, for example, according to the signal character that a signal response represented by the impulse response information can have on an impulse introduced into the lightning conductor. The signal character can also represent, for example, one or more capacitive, resistive and/or inductive characteristics of the reflection of the impulse introduced into the lightning conductor.

The differences, for example in the form and travel time of the electromagnetic waves, thus serve as an indicator for a defective lightning conductor.

According to an exemplary embodiment of all aspects of the invention, a determination of the at least one reference information based on an undamaged lightning conductor, which is comprised e.g. by a rotor blade, is effected by a determination of a corresponding impulse response information characterizing the undamaged lightning conductor.

Alternatively or additionally known parameters, which are available for example if the same lightning conductor has been measured before, can be entered directly, so that at least one reference information can be determined. This can also be done, for example, if (other) parameterization is not possible.

According to an exemplary embodiment of all aspects of the invention, the impulse response information is characterized as a function in the time domain.

The impulse response information as such a function comprises, for example, several values, e.g. amplitudes, which are mapped over a time domain, e.g. for a duration of zero to five seconds. For example, the multiple values are measured discretely or continuously.

In accordance with an exemplary embodiment of all aspects of the invention, the lightning conductor has at least one coupling point (also referred to as coupling position) at one end of the lightning conductor, wherein the impulse (e.g. generated by an impulse or step function generator) is introduced into the lightning conductor via the at least one coupling point.

The lightning conductor, for example, can have at least one coupling point to initiate the impulse. This coupling point can also be used, for example, to determine the impulse response information, e.g. by having a corresponding measuring device operatively connected to this coupling point or operatively connected to it. Furthermore, the lightning conductor may have a defined lightning impact point which is to be distinguished from the at least one coupling point for the introduction of the impulse in the sense of the present object.

According to an exemplary embodiment of all aspects of the invention, a total impedance information indicative of a total impedance of the lightning conductor is determined, the specification of the evaluation information further being at least partially based on the total impedance information.

The total impedance of the lightning conductor can be determined, for example, in the wake, e.g. based on the travel time of the impulse (the electromagnetic wave) and its form.

The total impedance of the lightning conductor results, among other things, from the conditions of the lightning conductor comprised by a rotor blade of a wind turbine. These are, for example, the length of the rotor blade, the length of the lightning conductor (e.g. designed as a single conductor), the number of defined impact points at which a lightning strikes the lightning conductor, just to name a few non-limiting examples. Furthermore, these can be the length and type of the lightning conductor, the specific resistance of the lightning conductor, the number of receptors of the lightning conductor, and/or the connection of the receptors, wherein all the above-mentioned conditions can be firmly defined by the rotor blade comprised by the wind turbine, which in turn comprises the lightning conductor.

According to an exemplary embodiment of all aspects of the invention, the total impedance information is determined based on the determined travel time of the impulse, its form, each represented by the determined impulse response information, and the specific resistance of the lightning conductor.

The total impedance of the lightning conductor can be determined by the signal travel length represented by the impulse response information (e.g. the measured travel time of the electromagnetic wave or its reflection), its represented form and the specific resistance (which depends e.g. on temperature and material of the lightning conductor).

According to an exemplary embodiment of all aspects of the invention, the impulse response information is determined by means of at least one tap at the beginning or end of the lightning conductor.

The tap can, for example, be identical with the coupling point for the introduction of the impulse into the lightning conductor or be operatively connected at the identical point. In particular, the at least one tap can be arranged at that end of the lightning conductor which is arranged, i.e. rotatably mounted, on the hub of a wind turbine, on which, for example, a rotor blade comprising the lightning conductor is arranged.

According to an exemplary embodiment of all aspects of the invention, the method is carried out by means of a time domain reflectometry device, the time domain reflectometry device comprising at least one impulse generator for introducing the impulse and a measuring device for determining the impulse response.

The measuring device is, for example, an oscilloscope or comprises one or more functionalities of an oscilloscope. The reflection determined (e.g. measured) by means of the measuring device or several reflections of one or more introduced impulses (represented by the impulse response information) can be analyzed, for example. E.g. the one or more determined reflections can be compared with the impulse introduced into the lightning conductor, or in the case that a sequence comprising at least two impulses is introduced into the lightning conductor, with the respective ones from the sequence of impulses. Here, for example, the reflections can be analyzed for the presence of one or more signal characteristics, or these can be determined at least partially based on a difference between the introduced impulse and its reflection or between the introduced pulses and their reflections.

By means of the time domain reflectometry device, for example, it is possible to determine and analyze the travel length and reflection characteristics of electromagnetic waves and signals. With an impulse or step function generator, for example, an electromagnetic wave is sent into the lightning conductor at the beginning of the conductor of the lightning protection system. This wave is reflected at the end of the lightning protection system and sent back to its origin. The form of the reflected wave as well as its travel time is recorded and evaluated. If the lightning conductor is defective, i.e. the conductor of the lightning protection system is damaged in any way or completely broken, the form of the reflected wave changes.

The exemplary embodiments of all aspects of the present invention, which are described above and which initially basically stand alone, should also be understood in all combinations with each other in a disclosed manner.

Further advantageous exemplary embodiments of the invention can be found in the following detailed description of some exemplary embodiments of the present invention, especially in connection with the figures. However, the figures enclosed with the application should only serve the purpose of clarification, but not to determine the scope of protection of the invention. The enclosed drawings are not necessarily to scale and are merely intended to illustrate the general concept of the present invention. In particular, features contained in the figures should not necessarily be considered as a necessary element of the invention.

SHORT DESCRIPTION OF THE FIGURES

DETAILED DESCRIPTION OF SOME EXEMPLARY EMBODIMENTS OF THE INVENTION

Figure 1:
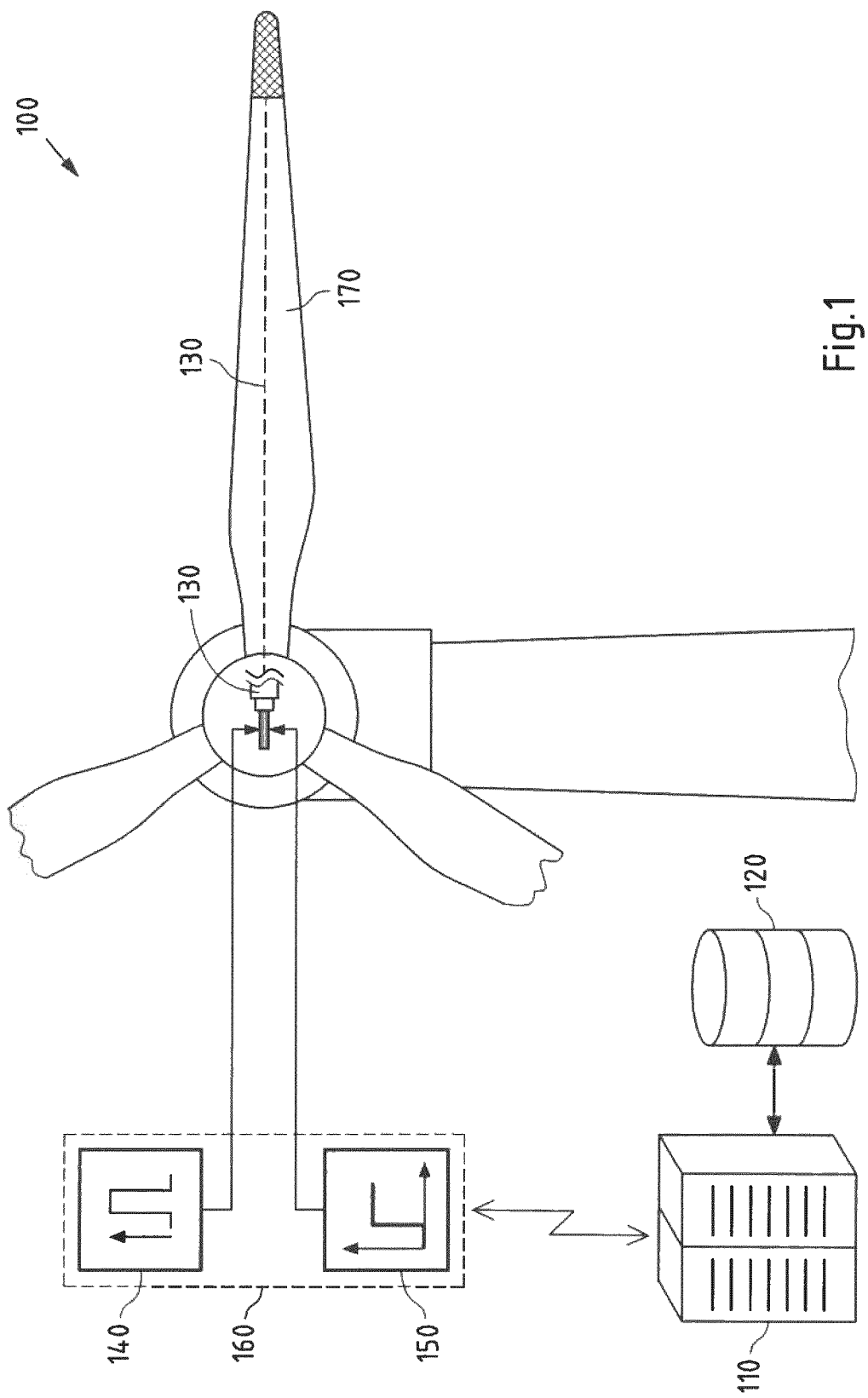
FIG. 1 shows a schematic representation of an exemplary embodiment of a system according to the present invention.

FIG. 1 is a schematic representation of an exemplary embodiment of a system 100 according to the present invention. The system 100 comprises a server 110, an optional database 120, a lightning conductor 130, which in the present case is comprised by schematically displayed rotor blade 170 of a wind turbine, as well as a device 160 for inspecting the lightning conductor 130, wherein with this device 160 it is possible to inspect whether the lightning conductor 130 is functional or not.

Device 160 may be a time domain reflectometry device, and may include, for example, an impulse generator or step function generator 140, and a measuring device 150 (e.g. a measuring instrument designed as an oscilloscope). The device 160 is comprised in particular by a wind turbine (not shown in FIG. 1), which also has the rotor blade 170 comprising the lightning conductor 130. It is advantageous that the device 160 or the entities 140 and 150 included in the device 160 are operatively (e.g. electrically) connected to a coupling point of the lightning conductor 130. The lightning conductor 130 has such a coupling point in particular at one end, in particular at that end of the lightning conductor 130 which faces a hub at which, for example, the rotor blade 170 is also connected to a wind turbine.

The output of the specific evaluation information (cf. step 240 of FIG. 2) is made, for example, to the server 110 by transmitting the evaluation information to the server 110, for example via a communication network (e.g. the Internet).

For example, the Server 110 is further operatively connected to an optional database 120, or the Server 110 comprises, for example, the optional database 120, which has a memory in which, for example, one or more reference information (cf. optional step 210 of FIG. 2), or at least temporarily one or more impulse response information and/or evaluation information can be stored.

Figure 3:
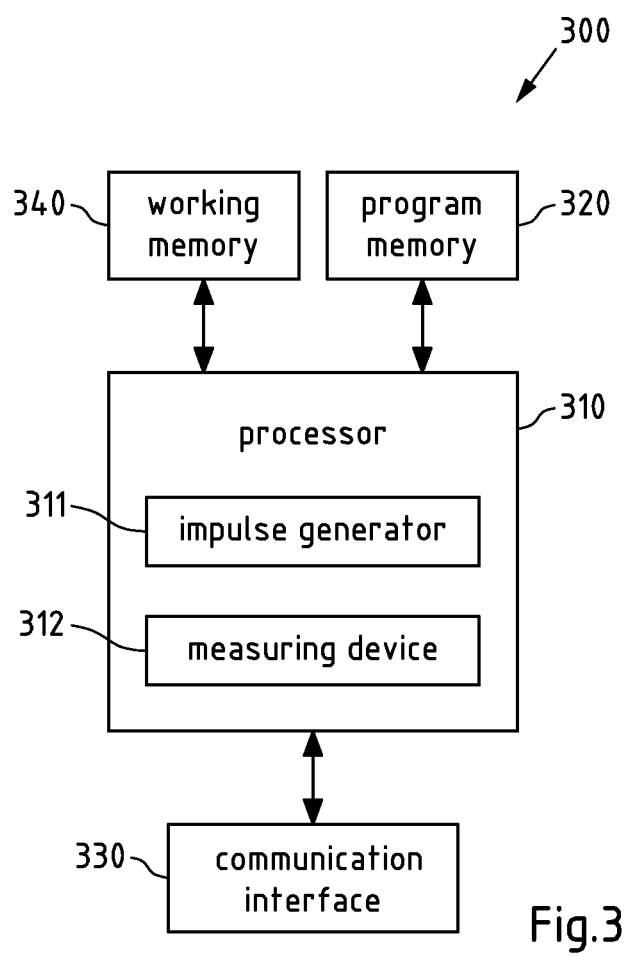
FIG. 3 shows a schematic representation of an exemplary embodiment of a device according to the present invention.

FIG. 3 shows a schematic representation of an exemplary design of a device 300 which can be used in the context of the present invention.

Figure 2:
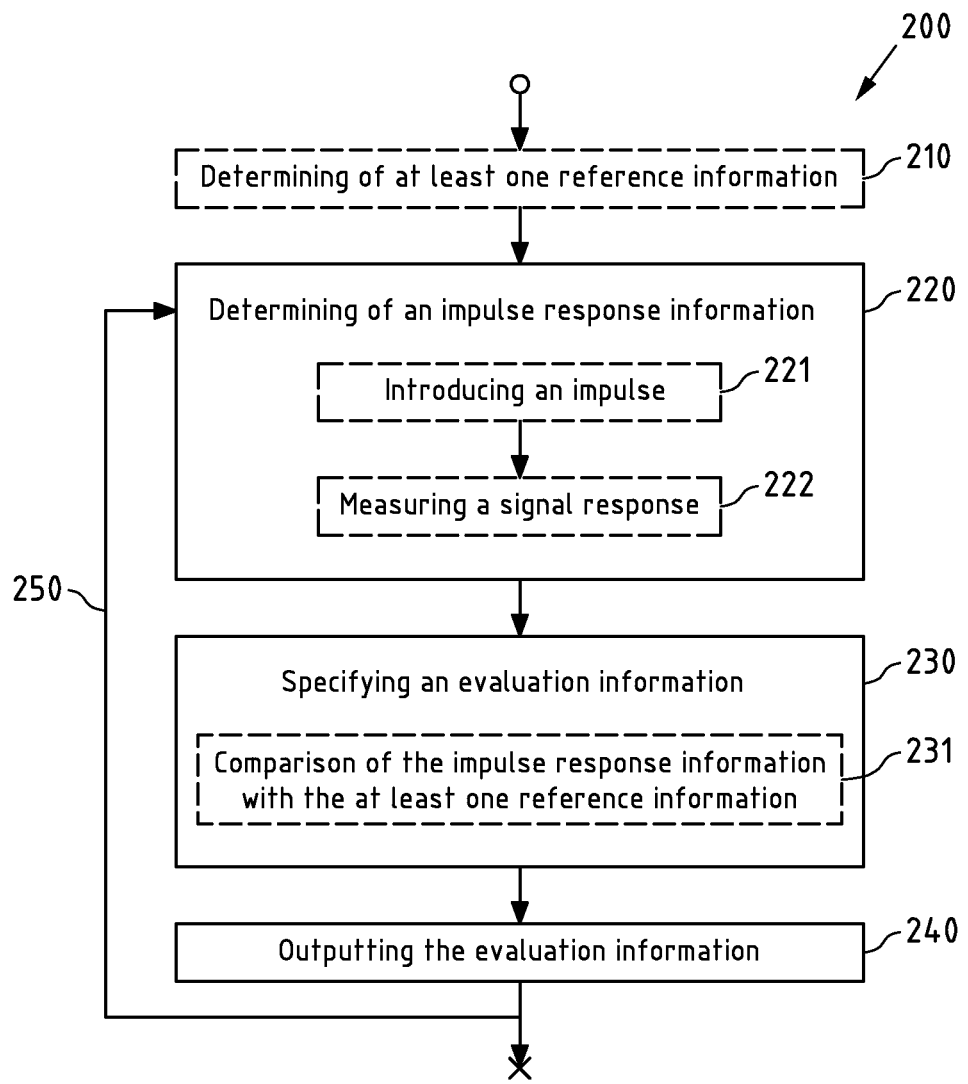
FIG. 2 shows a flow chart of an exemplary embodiment of a method according to the first aspect according to the present invention.

The device 300 can, for example, represent the device 160 according to FIG. 1 (and then, for example, perform the method of flow chart 200 according to FIG. 2). The device 300 can also represent for example the server 110 according to FIG. 1 (and then for example perform together with the device 160 according to FIG. 1 the method of the flow chart 200 according to FIG. 2).

Device 300 includes a processor 310 with allocated memory 340 and program memory 320, for example, the processor 310 executes program instructions stored in program memory 320. The program instructions execute and/or control the method according to the first aspect of the invention. Thus, the program memory 320 contains a computer program according to an exemplary aspect of the invention and represents a computer program product for its storage. Device 300 represents an example of a device according to the second aspect of the invention.

For example, program memory 320 can be a persistent memory, such as a read-only memory (ROM) memory. For example, program memory 320 can be permanently connected to the processor 310, but can also be connected to the processor 310 in a detachable manner, for example as a memory card, diskette or optical data carrier medium (e.g. a CD or DVD). Additional information can also be stored in the program memory 320, or in a separate memory.

The working memory 340 is used, for example, to store temporary results during the execution of program instructions. This is a volatile memory, such as random access memory (RAM).

The processor 310 is also operatively connected to a communication interface 330, which allows, for example, the exchange of information with other devices (see e.g. the arrows between the entities included in the system 110 according to FIG. 1).

The 300 device may also contain or include other components. If device 300 represents an sensor device (e.g. measuring device 150 according to FIG. 1), e.g. for determining an impulse response information (cf. step 201 according to FIG. 2), there is in particular an detection means for determining the impulse response, which is set up as a structural and/or functional unit, e.g. for signal determining (e.g. measuring) in the form of a measuring device 312 (e.g. a measuring instrument), and is operatively connected to the processor 310 or comprised by it. The device 300, in particular the processor 310, may further comprise an impulse generator 311 (or alternatively a jump function generator) as a structural and/or functional unit. For example, the impulse generator 311 may be configured to introduce an impulse into a lightning conductor (e.g. lightning conductor 130 according to FIG. 1) (cf. also step 221 of FIG. 2).

If device 300 represents a sensor device, means operatively connected to processor 310 may be provided for specifying evaluation information. Alternatively, the specification of evaluation information may be performed directly by processor 310.

FIG. 2 represents a flow chart 200 of an exemplary embodiment of a method which can be carried out by a device 160 in the context of the present invention for inspecting a lightning conductor, e.g. lightning conductor 130 according to FIG. 1.

In an optional first step 210 at least one reference information is determined. The determination of the at least one reference information is performed, for example, by an impulse generator (or alternatively a step function generator), e.g. impulse generator 140 according to FIG. 1. The device 160 or the impulse generator 140 introduces a generated impulse into the lightning conductor (e.g. lightning conductor 130 according to FIG. 1), e.g. via a coupling point to which the device 160 or the impulse generator 140 is operatively connected.

In a second step 220 an impulse response information is determined. Step 220 further comprises step 221, after which an impulse is introduced into the lightning conductor.

Step 220 further comprises step 222, which is performed subsequently to step 221, and after which a signal response is measured. The signal response measured in step 222 is represented, for example, by the impulse response information afterwards. The impulse response information is determined, for example, by a measuring device (e.g. measuring device 150 according to FIG. 1). The measuring device 150 is included in the device 160 according to FIG. 1, for example. The device 160 or the measuring device 150 is, for example, operatively connected to a coupling point which comprised by the lightning conductor. In the case that the measuring device 150 is comprised by the device 160, the measuring device 150 can be used to determine (e.g. measure) one or more reflections which are performed as signal response based on one or more impulses introduced into the lightning conductor 130. The impulse or several impulses introduced into the lightning conductor 130 can be generated, for example, by an impulse generator (e.g. impulse generator 140 according to FIG. 1) and introduced into the lightning conductor accordingly, in the case that a corresponding impulse generator is included in the device 160.

In a third step 230 an evaluation information is specified. Step 230 includes an optional comparison of the impulse response information (cf. step 220) with the at least one reference information (cf. step 210) in case the optional step 210 has been performed by the flow chart. The specification of the evaluation information can alternatively be performed from a server (e.g. server 110 according to FIG. 1) remote from the device 160, connected for example via a communication network (e.g. Internet). For this purpose, the impulse response information must first be transmitted from the device 160 to the server 110, for example.

In a fourth step 240 the specific evaluation information is output. The evaluation information is transmitted, for example, from the device 160 to a server (e.g. server 110 according to FIG. 1). The output evaluation information can then be further processed, e.g. stored in a database (e.g. database 120 as per FIG. 1) and/or output, e.g. to a user. The output can, for example, take place in such a way that the evaluation information is reproduced to a user, e.g. optically and/or acoustically by means of a device (e.g. display and/or loudspeaker) which is designed for the optical and/or acoustic reproduction of information.

If the evaluation information has been specified by a server (e.g. Server 110 according to FIG. 1), the output is sent to another server, e.g. the one from a network control center of a power grid into which the wind turbine comprising the lightning conductor, for example, feeds. Alternatively or additionally, the output can be analogous to the output to a user described above.

For example, steps 220, 230 and 240 can be repeated at regular intervals, e.g. predefined time intervals, and/or depending on an event, e.g. a lightning strike. This is shown schematically in the flow chart 200 by the arrow 250, which leads back to step 220.

The exemplary embodiments/examples of embodiments of the present invention described in this specification shall be understood as disclosed both individually and in all combinations with each other. In particular, the description of a feature comprised by an embodiment—unless explicitly stated otherwise—should not be understood in the present case as being indispensable or essential for the function of the embodiment. The sequence of the method steps described in this specification in the individual flowcharts is not mandatory; alternative sequences of method steps are conceivable. The method steps can be implemented in various ways, for example, implementation in software (through program instructions), hardware or a combination of both to implement the method steps is conceivable. Terms used in the claims such as "comprising", "having", "containing" or the like do not exclude further elements or steps. The expression "at least partially" covers both the "partially" case and the "completely" case. The wording "and/or" should be understood to mean that both the alternative and the combination should be disclosed, i.e. "A and/or B" means "(A) or (B) or (A and B)". A plurality of units, persons or the like in the context of this specification means several units, persons or the like. The use of the indefinite article does not exclude a plural. A single entity may perform the functions of several units or entities mentioned in the claims. Reference marks indicated in the claims should not be regarded as limitations of the means and steps used.

The invention claimed is:

1. A method for inspecting a lightning conductor of a lightning protection system comprised by a rotor blade of a wind turbine, wherein the wind turbine comprises a device for inspecting the lightning conductor and the rotor blade comprising the lightning conductor, wherein the device for inspecting the at least one lightning conductor is designed and/or set up for carrying out and/or implementing the method and the device is a time domain reflectometry device and comprises at least one impulse generator for initiating an impulse and a measuring device for determining an impulse response, the method comprising:

determining, by the measuring device impulse response information indicative of the impulse response, wherein the impulse response information is determined based on the impulse introduced into the lightning conductor which impulse is characterized by an electromagnetic wave, wherein the impulse response information represents at least a waveform and a travel time determined after the introduction of the impulse based on its reflection;

specifying, by the device, an evaluation information based on the determined impulse response information, wherein the impulse response information is analyzed at least with respect to the represented waveform and the travel time of the introduced and reflected electromagnetic wave, the evaluation information being indicative of whether or not the lightning conductor is functional; and outputting or causing, by the device, the output of the specified evaluation information.

2. The method according to claim 1, wherein specifying the evaluation information comprises comparing the waveform and/or travel time represented by the impulse response information with at least one reference information.

3. The method according to claim 1, wherein the specification of the evaluation information is based on one or more of the following parameters i) to ii):

(i) travel time of the introduced impulse; and
(ii) character of the reflected electromagnetic wave.

4. The method according to claim 2, wherein the at least one reference information is obtained by specifying corresponding impulse response information characterizing an undamaged lightning conductor of a rotor blade.

5. The method according to claim 1, wherein the impulse response information is characterized as a function in the time domain.

6. The method according to claim 1, wherein the lightning conductor has at least one coupling point at one end of the lightning conductor, wherein the impulse is introduced into the lightning conductor via the at least one coupling point.

7. The method according to claim 1, wherein a total impedance information indicative of a total impedance of the lightning conductor is determined, wherein the specification of the evaluation information is further based at least partially on the total impedance information.

8. The method according to claim 7, wherein the total impedance information is determined based on the determined travel time of the impulse, its form represented by the determined impulse response information, and the specific resistance of the lightning conductor.

9. The method according to claim 1, wherein the impulse response information is determined by means of at least one tap at the beginning or end of the lightning conductor.

10. A device adapted to perform and/or control a method for inspecting a lightning conductor of a lightning protection system comprised by a rotor blade of a wind turbine, comprising:

determining, by the device impulse response information indicative of an impulse response, wherein the impulse response information is determined based on an impulse introduced into the lightning conductor which is characterized by an electromagnetic wave, wherein the impulse response information represents at least a waveform and a travel time determined after the introduction of the impulse based on its reflection;

specifying, by the device an evaluation information based on the determined impulse response information, wherein the impulse response information is analyzed at least with respect to the represented waveform and the travel time of the introduced and reflected electromagnetic wave, the evaluation information being indicative of whether or not the lightning conductor is functional; and outputting or causing the output of the specified evaluation information, by the device.

11. A rotor blade for a wind turbine, comprising at least one lightning conductor and means for inspecting the at least one lightning conductor, wherein the means are configured to carry out and/or implement a method for inspecting the at least one lightning conductor of a lightning protection system comprised by the rotor blade of the wind turbine, comprising:

determining, by the device impulse response information indicative of an impulse response, wherein the impulse response information is determined based on an impulse introduced into the lightning conductor which is characterized by an electromagnetic wave, wherein the impulse response information represents at least a waveform and a travel time determined after the introduction of the impulse based on its reflection;

specifying, by the device an evaluation information based on the determined impulse response information, wherein the impulse response information is analyzed at least with respect to the represented waveform and the travel time of the introduced and reflected electromagnetic wave, the evaluation information being indicative of whether or not the lightning conductor is functional; and outputting or causing the output of the specified evaluation information, by the device.

12. A system comprising one or more devices adapted to carry out and/or control a method for inspecting a lightning conductor of a lightning protection system comprised by a rotor blade of a wind turbine, comprising:

determining, by the device impulse response information indicative of an impulse response, wherein the impulse response information is determined based on an impulse introduced into the lightning conductor which is characterized by an electromagnetic wave, wherein the impulse response information represents at least a waveform and a travel time determined after the introduction of the impulse based on its reflection;

specifying, by the device an evaluation information based on the determined impulse response information, wherein the impulse response information is analyzed at least with respect to the represented waveform and the travel time of the introduced and reflected electromagnetic wave, the evaluation information being indicative of whether or not the lightning conductor is functional; and outputting or causing the output of the specified evaluation information, by the device.

* * * * *